United States Patent
Aoki et al.

(10) Patent No.: US 12,090,518 B2
(45) Date of Patent: Sep. 17, 2024

(54) METHOD FOR PROCESSING ELECTRONIC AND ELECTRIC DEVICE COMPONENT SCRAPS

(71) Applicant: JX ADVANCED METALS CORPORATION, Tokyo (JP)

(72) Inventors: Katsushi Aoki, Hitachi (JP); Hidetoshi Sasaoka, Kitaibaraki (JP)

(73) Assignee: JX ADVANCED METALS CORPORATION, Tokyo (JP)

(*) Notice: Subject to any disclaimer, the term of this patent is extended or adjusted under 35 U.S.C. 154(b) by 366 days.

(21) Appl. No.: 17/599,236

(22) PCT Filed: Mar. 27, 2020

(86) PCT No.: PCT/JP2020/014358
§ 371 (c)(1),
(2) Date: Sep. 28, 2021

(87) PCT Pub. No.: WO2020/203910
PCT Pub. Date: Oct. 8, 2020

(65) Prior Publication Data
US 2022/0176410 A1 Jun. 9, 2022

(30) Foreign Application Priority Data
Mar. 29, 2019 (JP) .................... 2019-069380

(51) Int. Cl.
*B09B 3/35* (2022.01)
*B02C 23/20* (2006.01)
(Continued)

(52) U.S. Cl.
CPC ............. *B07B 4/02* (2013.01); *B02C 23/20* (2013.01); *B07B 4/08* (2013.01); *B07B 9/00* (2013.01); *B09B 3/35* (2022.01); *B09B 2101/17* (2022.01)

(58) Field of Classification Search
CPC .... B07B 4/02; B07B 9/00; B07B 9/02; B07B 11/06; B09B 3/35; B09B 2101/17; B02C 23/20; B03B 9/06
(Continued)

(56) References Cited

U.S. PATENT DOCUMENTS 3,905,556 A * 9/1975 Drage ..................... B02C 23/14
241/DIG. 38
5,676,318 A * 10/1997 Yokoyama ............. B02C 23/12
451/28
(Continued)

FOREIGN PATENT DOCUMENTS

| JP | 5-146703 A | 6/1993 |
| JP | 9-78151 A | 3/1997 |

(Continued)

OTHER PUBLICATIONS

Chinese Office Action and Search Report for corresponding Chinese Application No. 202080023295.8, dated Jul. 11, 2022, with English translation.
(Continued)

*Primary Examiner* — Michael McCullough
*Assistant Examiner* — Jessica L Burkman
(74) *Attorney, Agent, or Firm* — Birch, Stewart, Kolasch & Birch, LLP

(57) ABSTRACT

Provided is a method for processing electronic and electrical device component scrap, which can improve an efficiency of sorting of raw materials fed to the smelting step from electronic and electrical device component scrap, and reduce losses of valuable metals. A method for processing electronic and electrical device component scrap which includes sorting electronic and electrical device component scrap by wind powder sorting to remove plate-shaped materials containing valuable metals included in the electronic and elec- (Continued)

trical device component scrap, and then sorting the resulting sorted objects by magnetic sorting.

10 Claims, 7 Drawing Sheets

(51) Int. Cl.
  *B07B 4/02* (2006.01)
  *B07B 4/08* (2006.01)
  *B07B 9/00* (2006.01)
  *B09B 101/17* (2022.01)
(58) Field of Classification Search
  USPC .......................................................... 209/133
  See application file for complete search history.

(56) References Cited

U.S. PATENT DOCUMENTS

| | | | | |
|---|---|---|---|---|
| 5,829,597 | A * | 11/1998 | Bielagus | ................ D21B 1/023 209/139.1 |
| 11,819,885 | B2 * | 11/2023 | Aoki | ......................... B09B 3/35 |

FOREIGN PATENT DOCUMENTS

| | | | |
|---|---|---|---|
| JP | 11-244787 | A | 9/1999 |
| JP | 11-262732 | A | 9/1999 |
| JP | 2001-225020 | A | 8/2001 |
| JP | 2003-320311 | A | 11/2003 |
| JP | 2008-23938 | A | 2/2008 |
| JP | 4043917 | B2 | 2/2008 |
| JP | 4149121 | B2 | 9/2008 |
| JP | 4686827 | B2 | 5/2011 |
| JP | 2015-123418 | A | 7/2015 |
| JP | 2015-202436 | A | 11/2015 |
| JP | 2018-118223 | A | 8/2018 |
| JP | 2019-130488 | A | 8/2019 |
| KR | 10-1383180 | B1 | 4/2014 |
| WO | WO 2015/098232 | A1 | 7/2015 |
| WO | WO 2016/099338 | A1 | 6/2016 |

OTHER PUBLICATIONS

International Preliminary Report on Patentability and Written Opinion of the International Searching Authority (Forms PCT/IB/338, PCT/IB/373 and PCT/ISA/237) for International Application No. PCT/JP2020/014358, dated Oct. 14, 2021.
Extended European Search Report for corresponding European Application No. 20783521.6, dated Dec. 15, 2022.
International Search Report for PCT/JP2020/014358 mailed on Jun. 16, 2020.

* cited by examiner

METHOD FOR PROCESSING ELECTRONIC AND ELECTRIC DEVICE COMPONENT SCRAPS

FIELD OF THE INVENTION

The present invention relates to a method for processing electronic and electrical device component scraps. More particularly, it relates to a method for processing electronic and electrical device component scraps, which is suitable for recycling of used electronic and electrical devices.

BACKGROUND OF THE INVENTION

From the viewpoint of recent resource conservation, recovery of variable metals from electronic and electrical device component scrap such as waste electronic home appliances, PCs and mobile phones has increasingly become popular, and an efficient method for recovering the valuable metals has been studied and proposed.

For example, Japanese Patent Application Publication No. H09-78151 A (Patent Literature 1) discloses a recycling method for valuable metals, including the steps of charging scrap containing valuable metals into a flash furnace for smelting copper ores, and recovering the valuable metals into a mat that is retained in the furnace. According to such a recycling method, scrap processing can be combined with a copper smelting step in the copper smelting flash furnace, so that the valuable metals can be recovered at low cost even from scrap having a lower content of the valuable metals.

However, in the processing using the copper smelting flash furnace as disclosed in Patent Literature 1, an increased amount of the electronic and electrical device component scrap processed may lead to an increase in a carbon component contained in organic substances such as resins forming the electronic and electrical device component scrap, which may cause troubles due to over-reduction in the smelting furnace. On the other hand, since the amount of the electronic and electrical device component scrap processed tends to be increased in recent years, there is a need for efficient processing in the copper smelting flash furnace.

As one of methods for preventing the generation of troubles due to over-reduction in the copper smelting flash furnace, it is proposed that the electronic and electrical device component scrap is crushed before processing of the electronic and electrical device component scrap in a copper smelting flash furnace to reduce the volume. For example, Japanese Patent Application Publication No. 2015-123418 A (Patent Literature 2) discloses that electrical and electronic device component scrap containing copper is incinerated and then crushed to have a predetermined size or less, and the crushed electrical and electronic device component scrap is processed in a copper smelting furnace.

CITATION LIST

Patent Literatures

[Patent Literature 1] Japanese Patent Application Publication No. H09-78151 A
[Patent Literature 2] Japanese Patent Application Publication No. 2015-123418 A

SUMMARY OF THE INVENTION

In one aspect, the present invention completed on the basis of the above findings provide a method for processing electronic and electrical device component scrap, comprising sorting electronic and electrical device component scrap by wind powder sorting to remove plate-shaped materials containing valuable metals included in the electronic and electrical device component scrap, and then sorting the resulting sorted objects by magnetic sorting.

DETAILED DESCRIPTION OF THE INVENTION

Figure 1:
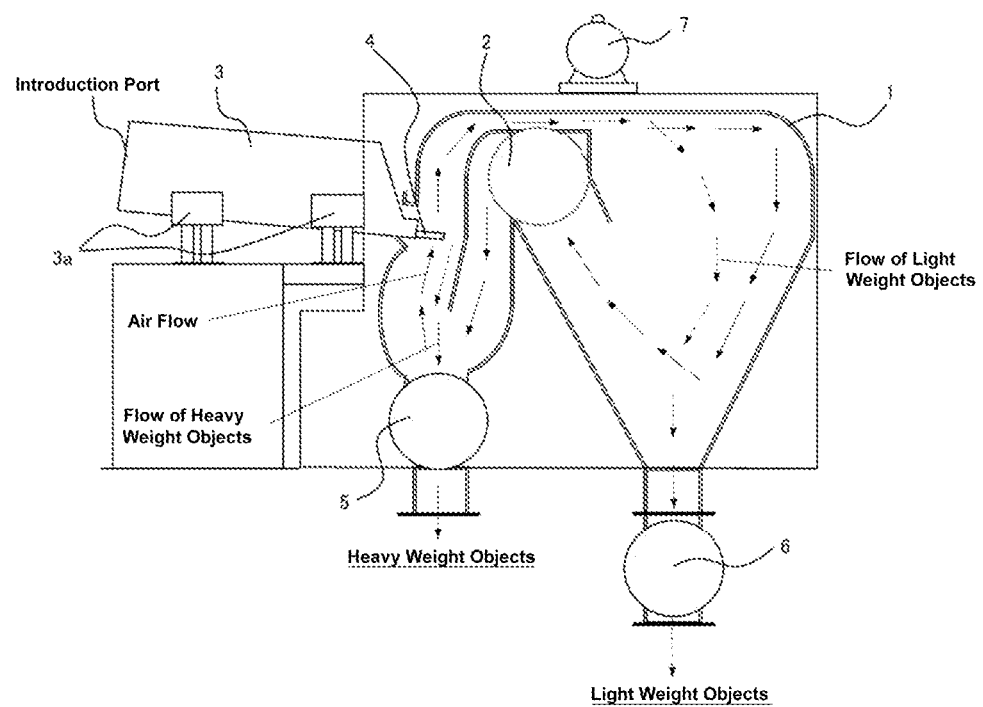
FIG. 1 is a cross-sectional view showing an example of a wind power sorter suitable for processing electronic and electrical device component scrap according to an embodiment of the present invention.

An increased amount of smelting inhibitors introduced into the copper smelting step due to the increased amount of electronic and electrical device component scrap to be processed arises a situation where an amount of the electronic and electrical device component scrap to be introduced has to be limited. It is desirable for the raw materials introduced to the smelting step to decrease the smelting inhibitor content as much as possible and to have higher contents of valuable metals. There are some types of electronic and electrical device component scrap, which contain both valuable metals and smelting inhibitors. Accordingly, when a sorter selected according to the physical properties of the smelting inhibitors is used in the sorting step to sort the raw materials to be fed into the smelting step, some of the components that contain valuable metals may be caught in the components that contain only the smelting inhibitors, resulting in larger losses of valuable metals.

In view of the above problems, the present invention provides a method for processing electronic and electrical device component scrap, which can improve an efficiency of sorting of raw materials fed to the smelting step from electronic and electrical device component scrap, and reduce losses of valuable metals.

As a result of intensive studies to solve the above problems, the present inventors have found that it is effective to sort electronic and electrical device component scrap by wind powder sorting to remove plate-shaped materials containing valuable metals included in the electronic and electrical device component scrap, and then sort the resulting sorted objects by magnetic sorting.

According to the present invention, it is possible to provide a method for processing electronic and electrical device component scrap, which can improve an efficiency of sorting of raw materials fed to the smelting step from electronic and electrical device component scrap, and reduce losses of valuable metals.

A method for processing electronic and electrical device component scrap includes sorting electronic and electrical device component scrap by wind powder sorting to remove plate-shaped materials containing valuable metals included in the electronic and electrical device component scrap, and then sorting the resulting sorted objects by magnetic sorting.

As used herein, the "electronic and electrical device component scrap" refers to scrap obtained by crushing electronic and electrical devices such as waste home electric appliances, PCs, and mobile phones, recovering them and then crushing them to have an appropriate size. In the present embodiment, the crushing for obtaining the electronic and electrical device component scrap may be performed by an operator. However, crushed objects may be purchased on the market.

As for the crushing method, it is desirable to crush the components without damaging their shapes as much as possible. For example, it is preferable to use a shear type crusher using a shear method or a hammer type crusher using an impact method. On the other hand, any apparatus belonging to the category of a crusher for the purpose of fine crushing is not included in the crushing process according to the present embodiment.

The electronic and electrical device component scrap is preferably separated into individual components in the form of circuit boards (substrates), wire scrap, parts such as ICs and connectors, metals, and synthetic resins (plastics) used for casings and the like, by coarse crushing in advance. This can provide easy sorting of particular individual components in the subsequent processing, thereby improving a sorting efficiency.

Through the coarse crushing process, the substrates in the electronic and electrical device component scrap are mainly classified into three classes: 1) substrates with lead wires and components; 2) substrates with lead wires; and 3) substrates with no lead wire. When the electronic and electrical device component scrap is crushed using a shear type crusher, the substrates with lead wires and components and the substrates with lead wires are mainly obtained. When the electronic and electrical device component scrap is crushed using a hammer type crusher, the substrates with no lead wire are mainly obtained.

The substrate with lead wires and components are those to which lead wires and metal components such as iron and aluminum are attached. Since the substrates with lead wires and components are heavier than the substrates with wire leads and the substrate with no lead wire, about 4-15% of them are distributed to heavy weight objects when wind power sorting is performed under conditions of the substrates with lead wires or the substrates with no lead wire. As a result, the substrates with lead wires and components, which have been distributed to the side of the substrates with lead wires or the substrate with no lead wire, are also distributed to the Fe scrap side and Al scrap side by subsequent magnetic sorting and eddy current sorting, which may cause losses of valuable metals. Therefore, it is desirable to crush the substrates with lead wires and components again to further separate the components attached to the substrates.

The substrates with lead wires are those which contain lead wires, and 99% or more of them can be distributed to the light weight object side by the wind power sorting process according to an embodiment as described below. Therefore, the substrates with lead wires are distributed to the light weight object side through the wind power sorting prior to magnetic sorting and the substrates with lead wires are removed from sorted objects (heavy weight objects) in advance, whereby the sorting efficiency and accuracy of the subsequent magnetic sorting will be improved and the recovery efficiency of valuable metals will be increased. Since the substrates with lead wires contain valuable metals such as copper, they can be used as raw materials to be fed into the smelting step, thereby improving a recovery efficiency of copper.

The substrates with no lead wire are those which do not contain any lead wire, component or the like. The weight of the sorted objects to be processed in the magnetic sorting step can be reduced by removing the substrates with no lead wire in advance in the wind power sorting step.

The electronic and electrical device component scrap to be fed into the wind power sorting is preferably crushed to have a maximum diameter of 100 mm or less, or even 50 mm or less, and a characteristic particle diameter of from 4 to 70 mm or from 4 to 50 mm. The "characteristic particle diameter" refers to an average value determined by extracting arbitrary 100 pieces from the electronic and electrical device component scrap, calculating an average value of long diameters of the electronic and electrical device component scrap extracts, and repeating these procedures five times to average the five average values.

In the wind power sorting, plate-shaped objects containing valuable metals included in the electronic and electrical device component scrap are removed by distributing them at least to the light weight object side. The plate-shaped objects containing valuable metals include the substrates with lead wires, the substrates with no lead wire, and the ICs as described above.

Since the plate-shaped objects containing valuable metals include valuable metals such as iron and copper, those plate-shaped objects can be removed in the initial stage of physical sorting and pre-sorted as raw materials to be fed into the smelting step, thereby reducing the losses of valuable metals in the subsequent physical sorting.

In order to fed the plate-shaped objects contained in the electronic and electric device component scrap to the light weight side more efficiently, the wind velocity is preferably 15 m/s or more, and more preferably 16 m/s or more, and even more preferably 16.5 m/s or more, as a processing condition for wind power sorting. On the other hand, if the wind velocity is too high, it may not be economical and may not efficiently remove plate-shaped objects of interest, in particular the substrates with lead wires. Therefore, the wind velocity is preferably 20 m/s or less, and more preferably 19 m/s or less, and even more preferably 18 m/s or less.

The wind power sorting can be carried out in at least two stages. For example, the wind power sorting can be a combination of a first wind power sorting process of previously separating powdery objects and film-shaped objects that will be adversely affected on discriminability of a camera of a sorter such as a color sorter and a metal sorter using a camera or the like used in the physical sorting, with a second wind power sorting process of concentrating the plate-shaped objects containing valuable metals to the light weight object side and separating metals including Fe, Al, and the like to the heavy weight object side. The first wind power sorting process can be carried out, for example, at a wind velocity of 5 to 8 m/s, and preferably 6 to 7 m/s, and the second wind power sorting process can be carried out under the same conditions as described above.

The first wind power sorting process may be carried out immediately before feeding the sorted objects into the sorter that uses the camera to recognize the objects, or prior to the feeding, it may be combined with any sorting stage. For example, the first wind powder sorting can be combined with at least one of magnetic sorting, sieving, or color sorting processes that take place after the wind power sorting.

Alternatively, in any stage for roughly crushing the electronic and electrical devices such as the waste home appliances, PCs, and mobile phones as described above, which will be raw materials for the electronic and electrical device component scrap to obtain a processing material, the wind power sorting process may be carried out to remove the plate-shaped objects and powder objects containing valuable metals, which can also be included in the embodiment according to the present invention.

The wind powder sorting can reduce amounts of plate-shaped objects distributed to the heavy weight object side, which is the sorted objects for magnetic sorting, to 10% by mass or less, or even 3% by mass or less, or even 1% by mass or less. This can improve a sorting efficiency of magnetic sorting and increase a recovery efficiency of valuable metals. Although it is related to the contents of plate-shaped objects in the raw material, the percentage of the plate-shaped objects distributed to the light weight object side by the wind power sorting can be 95% or more, 97% or more, or even 99% or more. The objects distributed to the light weight object side can be fed to the smelting step to recover valuable metals such as copper contained in the plate-shaped objects.

Each of FIGS. 1 to 5 shows an example of a wind power sorter suitable for the embodiment according to present invention. The wind power sorter includes: a diffusion chamber 1; a blower 2 for generating an air flow in the diffusion chamber 1; a feed portion 3 for feeding sorting objects including plate-shaped objects 10 into the diffusion chamber 1; a guide portion 4 extending into the diffusion chamber 1 from a terminal of the feed portion 3 on the diffusion chamber 1 side; a heavy weight object collecting portion 5 provided below the feed portion 3 in the diffusion chamber 1; and a light weight object collecting portion 6 provided below the diffusion chamber 1 on a deep side in a feeding direction of the sorting objects. Provided on an upper portion of the diffusion chamber is a blower motor 7 for circulating the air inside the diffusion chamber.

In the diffusion chamber 1, an air flow indicated by the solid arrows as shown in FIG. 1 is generated by the air blown from the blower 2. In the wind power sorter as shown in FIG. 1, a diagonally downward air flow directed from the blower 2 to the heavy weight object collecting portion 5 is formed, an upward air flow directed from the heavy weight object collecting portion 5 to the upper portion of the guide portion 4 is formed, a horizontal air flow directed from a feed port to the feeding direction on an upper part of the diffusion chamber 1 is formed, and a downward air flow directed from the upper portion of the diffusion chamber 1 to the light weight object collecting portion 6 is formed.

FIG. 1 shows an example in which the blower 2 is disposed near the central portion of the diffusion chamber. However, the present invention is not limited to the example as shown in FIG. 1, and may be any embodiment where the sorting objects fed to the upper portion of the guide portion 4 can be brought into contact with the upward air flow to sort the heavy weight objects and light weight objects in the sorting objects by wind power.

The sorting objects are fed from an introduction port of the feed portion 3 and fed to the guide portion 4 protruding into the diffusion chamber 1 while being vibrated by a vibrating member 3a. The sorting objects in the guide portion 4 are brought into contact with the upward air flow from below the guide portion 4. The air flow blows up the light weight objects above the guide portion 4 to diffuse them into the diffusion chamber 1, and the light weight objects falls to the light weight object collecting portion 6 side on the deep side in the feeding direction. The heavy weight objects having a gravity larger than that of the wind force of the upward air flow fed to the guide portion 4 falls below the guide portion 4 and are collected by the heavy weight object collecting portion 5. The dotted arrows in FIG. 1 indicate the flows of the heavy and light weight objects, respectively.

Figure 2:
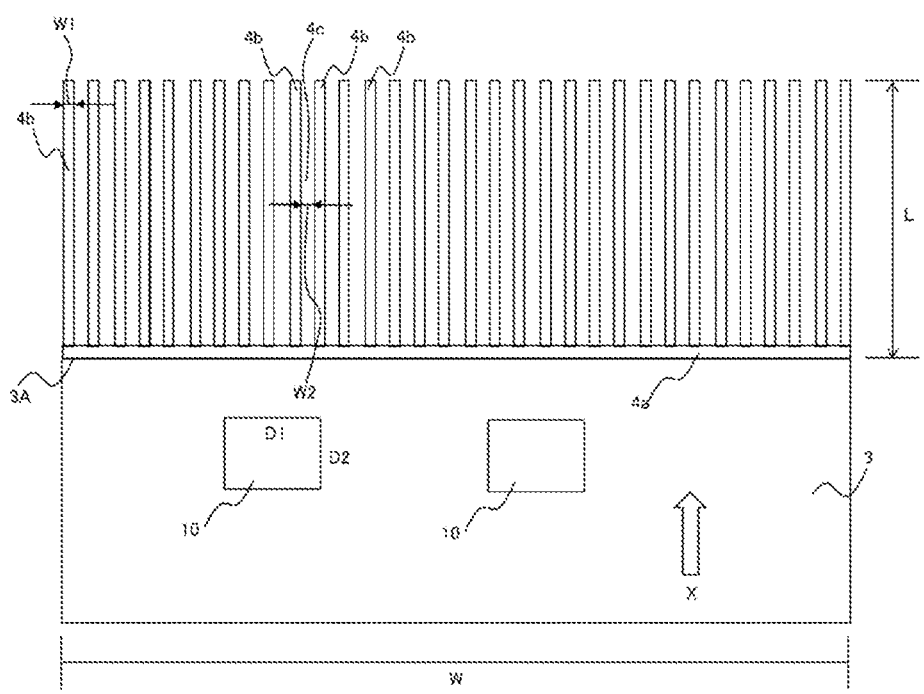
FIG. 2 is a plane view of a wind power sorter around a guide portion.

As shown in FIG. 2, the guide portion 4 has a comb shape, and includes: a base portion 4a connected to a terminal 3A of the feed portion 3 by welding or screwing, and a plurality of protruding portions 4b each protruding from the base portion 4a connected to the terminal 3A side of the feed portion 3 to the interior of the diffusion chamber 1. Each of the protruding portions 4b is formed such that its thickness (width) W1 becomes uniform from the terminal 3A side of the feed portion 3 to a feeding direction X. It is desirable that the plate-shaped objects come into contact with the air flow as much as possible from a time when the tips of the plate-shaped objects fly out from the terminal 3A side of the feed portion 3. Therefore, it is desirable that the protruding portions have a uniform thickness.

Among the respective protruding portions 4b, spaces 4c are provided, respectively, for bringing the air flow passing through the guide portion 4 into contact with the sorting objects, and a width W2 of each space 4c is formed to be uniform from the end 3A side of the feed portion 3 to the feeding direction X. Such a shape enables a larger amount of air flow to be applied to the sorting objects and more uniform air flow to be brought into contact with the sorting objects, so that they can be more easily pushed upward regardless of the type of light weight objects.

Figure 3:
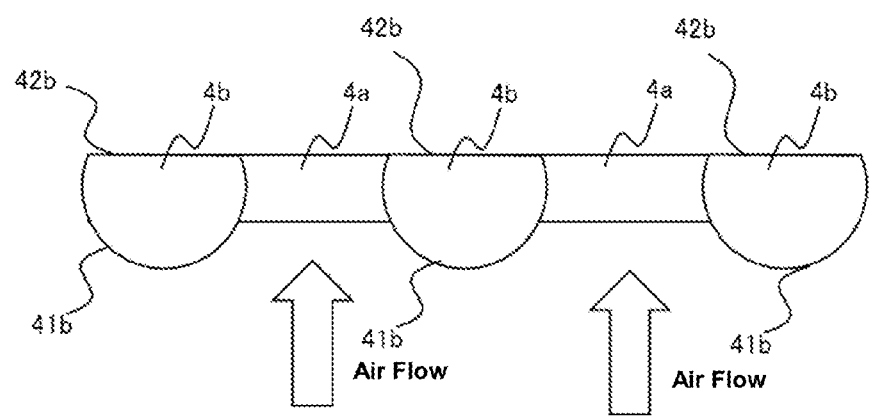
FIG. 3 is a plane view of a guide portion as viewed from a diffusion chamber side.

As shown in FIG. 3, it is preferable that at least a lower surface 41b of each protruding portion 4b has a curved surface. This can lead to lower air resistance of the guide portion 4 to the upward air flow flowing from below the guide portion 4, and an improved sorting efficiency of plate-shaped objects 10 according to the embodiment. In the example as shown in FIG. 3, the lower surface 41b of each protruding portion 4b has a curved surface, and an upper surface 42b of each protruding portion 4b, which is contacted with the sorting objects, has a flat surface. Such a shape can provide smooth feeding of the sorting objects on the upper surfaces 42b of the protruding portions 4b without being caught therein, and also reduce a contact resistance of each protruding portion 4b with the upward air flow flowing from the upper part to the lower part of each protrusion 4b, so that the air flow can be more efficiently brought into contact with the plate-shaped objects according to the present embodiment. In addition to the example as shown in FIG. 3, each protruding portion 4b may have, for example, a rod shape in which both the upper surface 42b and the lower surface 41b have curved surfaces. Each protruding portion may also have an inverted triangular shape for the purpose of being able to be smoothly provided and be efficiently contacted with the air flow.

A thickness W1 of each protrusion 4b and a width W2 of each space are preferably set to be lower than an average diameter D2 of short diameters of the plate-shaped objects 10 such that the plate-shaped objects 10, the sorting objects, do not fall out of the guide portion 4.

A length L (see FIG. 2) of the guide portion 4 from the terminal 3A side of the feed portion 3 to the tip side of the diffusion chamber 1 is preferably more than or equal to half, more preferably more than or equal to ⅔, of the average diameter D1 or D2, preferably the average diameter D1 of the long diameters, of the plate-shaped objects 10 which are the sorting objects. A width W of the guide portion 4 can be the same as the width of the feed portion 3.

The length L of the guide portion 4 of more than or equal to half of the average diameter D1 or D2 of the plate-shaped objects 10, preferably more than or equal to half of the average diameter D1 of the long diameters, can allow the upward flow from the lower part of the guide portion 4 to be sufficiently contacted with the plate-shaped objects 10, so that the plate-shaped objects 10 can be allowed to flow up to the upper part of the guide portion 4 more reliably to diffuse them to the light weight object collecting portion 6. If the length L is too long, the heavy weight objects such as metals that are desired to be transferred to the heavy weight object side may clog the spaces 4c, the length L is less than or equal to twice the average diameter D1 of the long diameters of the plate-shaped objects.

Each of the average diameters D1 and D2 of the plate-shaped objects 10 is determined by extracting arbitrary 10 pieces of the plate-shaped objects 10 in the sorting objects and calculating average diameters of the long and short diameters of the 10 extracted pieces. The procedures are repeated five times and an average value thereof is reported.

Specifically, a thickness W1 of each protruding portion 4b may be from 1 to 10 mm, and more preferably from 2 to 5 mm, and a width W2 of each space 4c may be from 1 to 20 mm, and preferably from 2 to 5 mm, and a length L of the guide portion 4 may be from 25 to 100 mm, and preferably from 40 to 70 mm, although not limited thereto.

Figure 4:
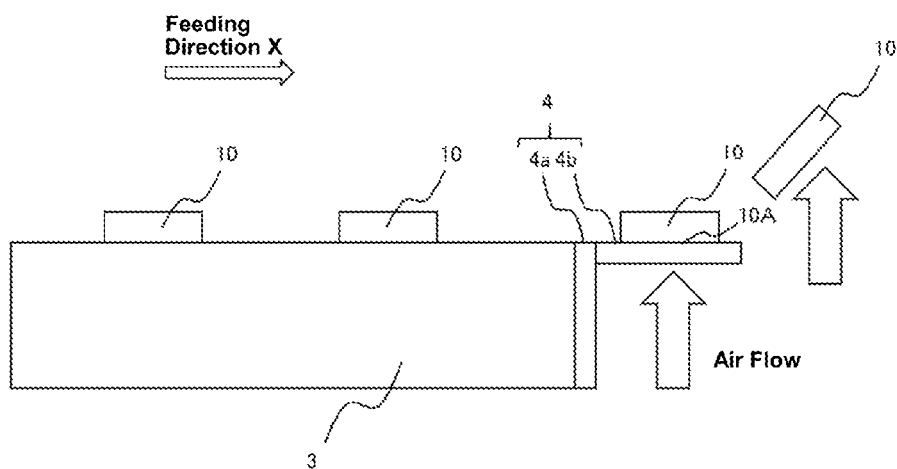
FIG. 4 is a side view of a wind power sorter around a guide portion.

As shown in FIG. 4, the guide portion 4 is arranged such that the air flow which flows from below the guide portion 4 in the upward direction is brought into contact with the lower surface 10A of the plate-shaped object 10 placed on the protruding portions 4b of the guide portion 4 in a perpendicular direction to the lower surface 10A of the plate-shaped object 10.

By arranging the guide portion 4 such that the air flow is brought into contact with the lower surface 10A of the plate-shaped object 10 in the perpendicular direction to the lower surface 10A, the force exerted by the upward flow of the air flow against the plate-shaped objects 10 can be maximized, so that the air resistance can be adjusted uniformly and maximally along the feed direction of the guide portion 4.

Figure 5:
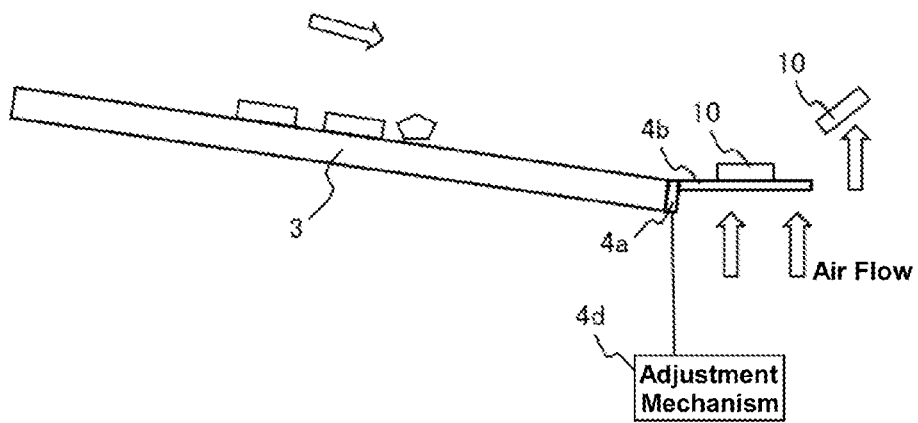
FIG. 5 is a side view of a wind power sorter around a guide portion.

As shown in FIG. 5, the wind power sorter may be provided with an adjustment mechanism 4d for adjusting an angle of the guide portion 4 such that the air flow is brought into contact with the lower surfaces of the plate-shaped objects 10 in the vertical direction to the lower surfaces. This can allow the air flow flowing from below the guide portion 4 to the upward direction to be brought into contact with the lower surfaces 10A of the plate-shaped objects 10 in the perpendicular direction to the lower surfaces 10A even if the feed portion 3 has an inclination.

The heavy weight object collecting portion 5 and the light weight object collecting portion 6 can be composed of a generally available discharge rotor or the like, and their specific configurations are not limited. Further, the plate-shaped objects 10 can be more efficiently sorted from the electronic and electric device component scrap by bringing the air blown from the blower 2 at a wind velocity of 15 m/s or more into contact with the lower surfaces 10A of the plate-shaped objects 10.

According to the wind power sorting device as shown in FIG. 1 and the wind power sorting method using the same, the provision of the guide portion 4 enables the air flow to be efficiently brought into contact with the plate-shaped objects 10 in the electronic and electrical equipment scrap, which are the sorting objects. This can allow the plate-shaped objects 10 having air resistance significantly varied depending on the direction exposed to the wind, to be more efficiently sorted to the light weight object side (in the light weight object collecting portion 6).

Figure 6:
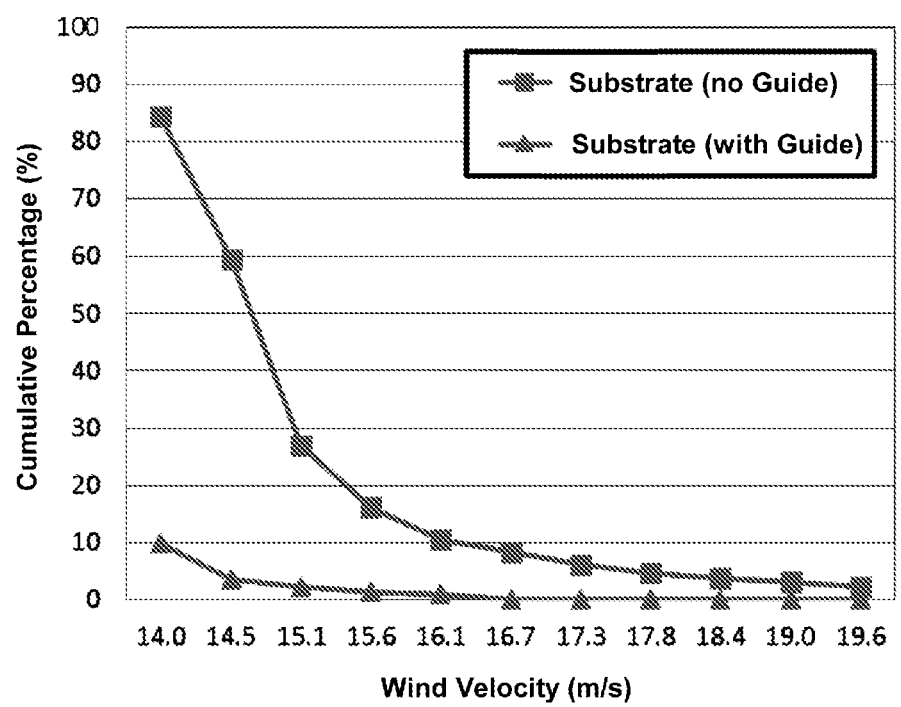
FIG. 6 is a graph showing a change in a ratio of distribution of substrates with wire leads to a heavy weight object side when a wind velocity is changed in cases where a wind power sorter having a guide portion (with guide) and a wind power sorter having no guide portion (no guide) are used.
Figure 7:
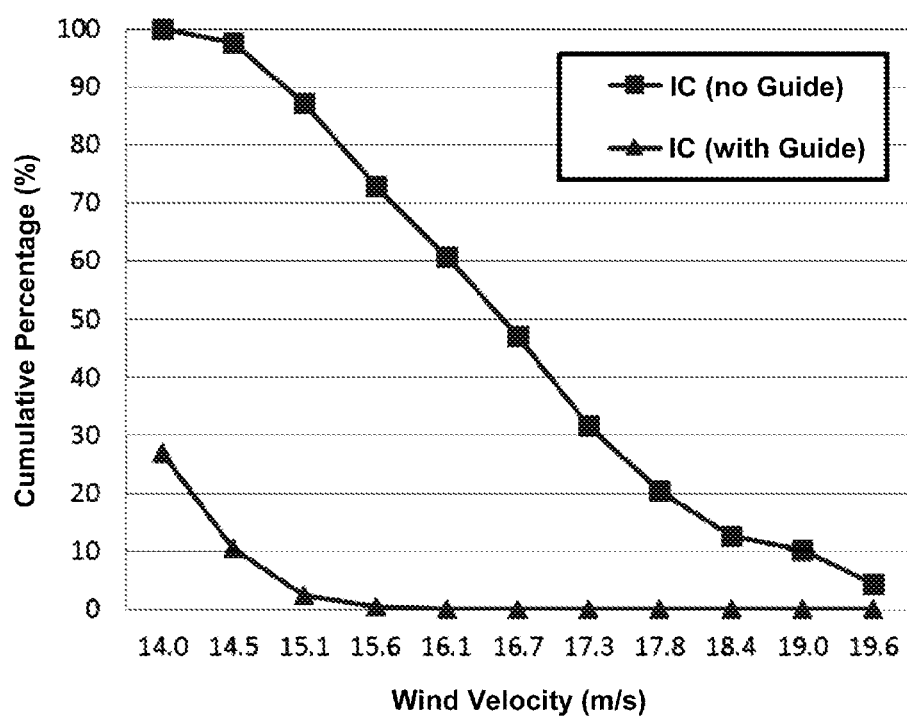
FIG. 7 is a graph showing a change in a ratio of distribution of flat plate-shaped ICs to a heavy object side when a wind velocity is changed in cases where a wind power sorter having a guide portion (with guide) and a wind power sorter having no guide portion (no guide) are used.

FIG. 6 and FIG. 7 show transitions of distribution rates of the substrates and flat plate-shaped ICs as the plate-shaped objects containing valuable metals to the heavy weight object side in cases where the wind power sorter having the guide portion 4 (with guide) is used, and a conventional wind power sorter having no guide portion 4 (no guide) is used to change the wind velocities to sort the electronic and electrical device component scrap.

As shown in FIG. 6, in the case where the wind power sorting process is carried out at a wind velocity of 15 m/s or more, about 30% of the substrates transfer to the heavy weight object side for the wind power sorter having no guide portion 4, whereas the wind power sorter having the guide portion 4 can significantly reduce the contamination of the substrates that transfer to the heavy weight object side to 3% or less. In the case where the wind power sorter as shown in FIG. 1 is used, the percentage of the substrates contaminated into the heavy weight object side can be further reduced to less than or equal to 1% by increasing the wind velocity to 16 m/s or more, and reduced to substantially 0% at 16.7 m/s or more.

As shown in FIG. 7, in the case where the wind power sorting process is carried out at a wind velocity of 15 m/s or more, about 90% of the substrates transfer to the heavy weight object side for the wind power sorter having no guide portion 4, whereas the wind power sorter having the guide portion 4 can significantly reduce the contamination of the substrates that transfer to the heavy weight object side to 3% or less. In the case where the wind power sorter as shown in FIG. 1 is used, the percentage of the substrates contaminated into the heavy weight object side can be further reduced to less than or equal to 1% by increasing the wind velocity to 15.6 m/s or more, and reduced to substantially 0% at 16.1 m/s or more.

Since the ICs are partially made of iron, they may be distributed to the magnetic object side in the magnetic sorting, which may cause the ICs to be contaminated when sorting Fe in the magnetic sorting to reduce a recovery efficiency of valuable metals. By using the wind power sorting according to the embodiment of the present invention, the flat plate-shaped ICs can be previously removed before magnetic sorting, thereby suppressing the reduction of the recovery efficiency of valuable metals in the magnetic sorting. In general, the maximum diameter of the ICs after the crushing process is often smaller than that of substrates. Therefore, when the wind power sorting is carried out using the wind power sorter having the guide portion 4 in FIG. 1, the larger amounts of ICs can be recovered on the light weight object side, thereby suppressing the contamination in the heavy weight object side. According to tests conducted by the present inventors, a percentage of ICs contaminated in the heavy weight objects was 61% when the guide portion 4 was not provided, whereas the percentage of ICs contaminated in the heavy weight objects was significantly reduced to 0.1% or less when the guide portion 4 was provided.

According to the method for processing electronic and electric device component scrap according to the embodiment of the present invention, prior to magnetic sorting of the electronic and electric device component scrap, the substrates in the electronic and electric device component scrap, in particular, the substrates with lead wires, which would reduce the sorting efficiency of magnetic sorting, can be removed in advance by the wind power sorting process, thereby suppressing the reduction of the sorting efficiency of the magnetic sorting due to the contamination of the substrates with lead wires in Fe scrap or Al scrap, and reducing the losses of valuable metals.

Furthermore, if it is desired to recover Al, for example, by eddy current sorting after magnetic sorting, the substrates contain copper and have higher electrical conductivity. Therefore, a lager crushed particle size will lead to distribution to a repulsive side as with Al in the eddy current sorting. Therefore, the substrates that are contaminated in the non-magnetic object side without being distributed to the magnetic object side in the magnetic sorting may be distributed to the Al scrap in the eddy current sorting. In the present invention, the losses of substrates in the eddy current sorting as well as the magnetic sorting can be reduced by carrying out the wind power sorting process in advance prior to the magnetic sorting and eddy current sorting processes. Therefore, the process of the embodiment can more advantageously exert the effect of reducing the losses of valuable metals, especially when the process has the physical sorting step that carries out the eddy current sorting after magnetic sorting.

The percentage of the substrates distributed in the magnetic materials by the magnetic sorting is preferably 5% or less, and more preferably 3% or less, and even more preferably 1% or less. By decreasing the percentage of the substrates distributed in the magnetic materials by the magnetic sorting as much as possible, the losses of the substrates can be reduced when the eddy current sorting is subsequently carried out.

Thus, the present invention is not limited to each embodiment, and the components may be modified and embodied without departing from the spirit of the present invention. Further, various inventions may be created by appropriately combining the plurality of components disclosed in the present embodiment. For example, some components may be removed from all the components shown in the embodiments, or the components of different embodiments may be optionally combined.

DESCRIPTION OF REFERENCE NUMERALS 1 diffusion chamber
2 blower
3 feed portion
3A terminal
3a vibration member
4 guide portion
4a base portion
4b protruding portion
4c space
4d adjustment mechanism
5 heavy weight object collecting portion
6 light weight object collecting portion
7 exhaust portion
10 plate-shaped object

The invention claimed is:

1. A method for processing electronic and electrical device component scrap, comprising sorting electronic and electrical device component scrap by wind power sorting to remove plate-shaped objects containing valuable metals from the electronic and electrical device component scrap, and then sorting resulting sorted objects by magnetic sorting, wherein the plate-shaped objects are sorted by using a wind power sorter comprising;

a diffusion chamber which diffuses the plate-shaped objects therein using an air flow;

a blower which generates the air flow in the diffusion chamber;

a feed portion which feeds the electronic and electrical device component scrap into the diffusion chamber while vibrating the scrap; and a guide portion extending into the diffusion chamber from a terminal of the feed portion, the guide portion having a comb shape and comprising a plurality of protruding portions having a space therebetween, a width of the space being formed to be uniform from the terminal of the feed portion to a feeding direction, and the guide portion being arranged such that the air flow is brought into uniform contact with the plate-shaped objects from lower surfaces of the plate-shaped objects in a perpendicular direction to the lower surfaces of the plate-shaped objects.

2. The method for processing electronic and electrical device component scrap according to claim 1, wherein the plate-shaped objects comprise at least one of substrates with lead wires, substrates with no lead wire, and ICs.

3. The method for processing electronic and electrical device component scrap according to claim 1, wherein the plate-shaped objects having a maximum diameter of 100 mm or less are removed.

4. The method for processing electronic and electrical device component scrap according to claim 1, wherein the plate-shaped objects in the sorted objects are reduced to 10% by mass or less by the wind power sorting.

5. The method for processing electronic and electrical device component scrap according to claim 1, wherein the wind power sorting is carried out at a wind velocity of 15 m/s or more.

6. The method for processing electronic and electrical device component scrap according to claim 1, wherein the electronic and electrical device component scrap before being subjected to the wind power sorting is crushed using a shear crusher or a hammer crusher.

7. The method for processing electronic and electrical device component scrap according to claim 1, further comprising performing eddy current sorting after the magnetic sorting.

8. The method for processing electronic and electrical device component scrap according to claim 1, wherein the wind power sorting comprises sorting the plate-shaped objects including substrates with lead wires to a light weight side of the wind power sorter.

9. The method for processing electronic and electrical device component scrap according to claim 1, wherein the wind power sorting comprises:

a first wind power sorting to remove powdery objects and film-shaped objects from the electronic and electrical device component scrap; and a second wind power sorting to remove the plate-shaped objects containing valuable metals included in the electronic and electrical device component scrap.

10. The method for processing electronic and electrical device component scrap according to claim 9, wherein a wind power velocity of the first wind power sorting is 5 m/s to 8 m/s and a wind power velocity of the second wind power sorting is 15 m/s to 20 m/s.

\* \* \* \* \*